(12) United States Patent
Li et al.

(10) Patent No.: US 9,983,374 B2
(45) Date of Patent: *May 29, 2018

(54) WDM MUX/DEMUX ON CABLE AND METHODS OF MAKING THE SAME

(71) Applicant: Alliance Fiber Optic Products, Inc., Sunnyvale, CA (US)

(72) Inventors: Yao Li, Newark, CA (US); Charlie Xiao, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/278,188

(22) Filed: Sep. 28, 2016

(65) Prior Publication Data

US 2017/0017053 A1    Jan. 19, 2017

Related U.S. Application Data

(63) Continuation of application No. 14/177,477, filed on Feb. 11, 2014, now Pat. No. 9,482,819.

(60) Provisional application No. 61/851,114, filed on Mar. 4, 2013.

(51) Int. Cl.
*H04B 10/00* (2013.01)
*G02B 6/42* (2006.01)
*G02B 6/293* (2006.01)
*G02B 6/44* (2006.01)
*G02B 6/36* (2006.01)

(52) U.S. Cl.
CPC ......... *G02B 6/4292* (2013.01); *G02B 6/2938* (2013.01); *G02B 6/29365* (2013.01); *G02B 6/4446* (2013.01); *G02B 6/4452* (2013.01); *G02B 6/3664* (2013.01)

(58) Field of Classification Search
CPC .... H04B 10/40; H04B 10/801; G02B 6/2938; G02B 6/4292; G02B 6/4446; G02B 27/148; G02B 6/29365; G02B 6/4452; G02B 6/3664; H04J 14/02; H04J 14/021; H04J 14/0201; H04Q 2011/0016
USPC .............................. 398/135–139, 79, 68, 82
See application file for complete search history.

(56) References Cited

U.S. PATENT DOCUMENTS

| | | | | |
|---|---|---|---|---|
| 5,452,124 A | * | 9/1995 | Baker | G02B 6/2937 359/341.2 |
| 7,490,998 B2 | | 2/2009 | Atieh et al. | |
| 7,840,138 B2 | * | 11/2010 | McEwan | H04J 14/02 398/135 |
| 7,856,185 B2 | * | 12/2010 | Hudgins | H04B 10/075 385/88 |
| 7,933,521 B2 | * | 4/2011 | Wen | G02B 6/29367 398/135 |
| 8,155,520 B1 | * | 4/2012 | West | G02B 6/43 398/50 |
| 8,358,934 B2 | * | 1/2013 | Hinderthuer | H04Q 11/0005 398/113 |

(Continued)

*Primary Examiner* — Hibret Woldekidan
(74) *Attorney, Agent, or Firm* — Robert L. Branham

(57) ABSTRACT

Techniques for WDM Mux/DeMux on cable and methods of making the same are described According to one aspect of the present application, a unit designed to provide multiplexing or demultiplexing (Mux/Demux) functions is implemented on cable. In other words, the Mux/Demux unit is coupled by a multi-fiber cable to a system (e.g., a system rack for router or switch that has multiple pluggable transceiver slots).

20 Claims, 17 Drawing Sheets

(56) References Cited

U.S. PATENT DOCUMENTS

| | | | |
|---|---|---|---|
| 8,461,514 B1* | 6/2013 | Rickenbach | G01D 5/268 250/231.13 |
| 9,482,819 B2* | 11/2016 | Li | G02B 6/29365 |
| 9,847,838 B2* | 12/2017 | Ward | H04B 10/2972 |
| 2004/0008927 A1* | 1/2004 | Kowalkowski | G02B 6/4292 385/24 |
| 2005/0025486 A1* | 2/2005 | Zhong | H04B 10/2503 398/79 |
| 2007/0077065 A1* | 4/2007 | Forsberg | H04B 10/0775 398/30 |
| 2008/0013897 A1* | 1/2008 | Atieh | G02B 6/3825 385/89 |
| 2009/0196617 A1* | 8/2009 | Yoshizaki | G02B 6/4246 398/82 |
| 2010/0322632 A1* | 12/2010 | Way | H04B 10/5167 398/79 |
| 2011/0038478 A1* | 2/2011 | Akiyama | H04L 9/3093 380/44 |
| 2011/0164883 A1* | 7/2011 | Hudgins | H04B 10/40 398/141 |
| 2011/0200324 A1* | 8/2011 | Boertjes | H04J 14/0212 398/16 |
| 2013/0148984 A1* | 6/2013 | Kalogerakis | H04B 10/50 398/200 |
| 2013/0308951 A1* | 11/2013 | Blumenthal | H04J 14/02 398/83 |

\* cited by examiner

WDM MUX/DEMUX ON CABLE AND METHODS OF MAKING THE SAME

CROSS-REFERENCE TO RELATED APPLICATION

This application is a continuation application of U.S. patent application Ser. No. 14/177,477 filed Feb. 11, 2014, which claims the benefit of U.S. Provisional Application No. 61/851,114, filed Mar. 4, 2013, the contents of which are hereby incorporated by reference.

TECHNICAL FIELD

The application is generally related to the area of optical communications. In particular, the application is related to WDM Mux/DeMux on cable and methods of making the same.

BACKGROUND

Broadband internet has experienced a compounded annual bandwidth growth rate exceeding 30% over the last decade. The momentum shows no sign of slowing down as wireless broadband, due to the smart phones and portable devices, joins the game. Fibers that facilitate much of such land-line bandwidth supports in the past now challenge device and equipment development to keep up the speed to fill their available bandwidth capacities. In core networks, transport equipment can now support 40 Gbps and 100 Gbps per wavelength using dense wavelength division multiplexing (DWDM) carriers. 400 Gbps and even 1 Tbps per wavelength channel are being discussed and laboratory tried.

The core network availability of such high capacity data inevitably puts pressure on fiber optical transceivers to keep up with the bandwidth growth so that the Internet routers and switches can be efficiently used. IEEE has released some international standards on 40 Gbps and 100 Gbps Ethernet based transceivers. For the first time in history, we have seen that in order to keep up with the bandwidth growth demand of transceivers, more than a single wavelength are called for duty in order to transmit 40 or 100 Gbps data over 10 km distance via a single mode (SM) fiber. This is largely because even by using various data compression and forward error correction (FEC) techniques, no compact and right power consumed electro-optic modulator can handle such a high bandwidth data single handedly. 4×10 Gbps and 4×25 Gbps formats have been proposed to provide the aggregate data rate of 40 Gbps and 100 Gbps using 4 wavelength channels for transceivers.

After successful developments of 2.5 Gbps and 10 Gbps single wavelength fiber optic transceivers, the transceiver makers have been getting used to the device form factors, such as small form pluggable (SFP) and quad small form pluggable (QSFP), each of which typically has an electrically pluggable connector at back- and duplex fiber (2 fibers each for input and output) connector adapter port at front-end. Inside the SFP, each of the so-called transmitting optical sub-assembly (TOSA) and receiving optical sub-assembly (ROSA) unit is residing on a printed-circuit board (PCB) that provides power, control and various other supporting functions. While a TOSA typically has a laser and a modulator along with some coupling optics to a fiber output, a ROSA has a photo-detector and a trans-impedance amplifier along with some coupling optics for a fiber input.

In prior art, a typical fiber optical transceiver architecture is depicted in FIG. 1. Traditional TOSA units and ROSA units are very compact and deal with a single wavelength with no multiplexing (Mux) and demultiplexing (DeMux) functionalities needed. To embrace the new standards, the transceiver and TOSA/ROSA makers now are working on integrating WDM Mux/DeMux capabilities in order to offer the complete 40 Gbps and 100 Gbps transceiver capabilities.

FIG. 2 shows a 4-ch TOSA/ROSA. It has a fiber port and a coupling lens that collimates an optical beam from an incoming fiber. In a zig-zag free space geometry, the collimated beam passes through 4 WDM thin-film filters (some reflected by the mirrors before reaching their destination filters). In a ROSA case, each such a beam is refocused back by its micro lens to one of four photo-detectors. On the contrary, for a TOSA case, optical signals are first generated by the four WDM lasers, through their respective microlenses to be collimated and then traverse through the zig-zag cavity made by the 4 thin-film filters and 3 mirrors that combine these four laser beams into one single beam (hence multiplexing) before being focused into the fiber port. For simplicity, no other electronic part details are shown in FIG. 2. One fundamental advantage of this thin-film based Mux/DeMux scheme is that the light power loss is small. Typically the maximum loss will be practically smaller than 1.25 dB.

Another prior art that does not use thin-film filter as WDM mux-demux mechanism works with a planar lightwave circuit (PLC). Shown in FIG. 3 is a typical PLC based combiner that acts as a 4 to 1 WDM input combiner. There are no filters or mirrors employed but the price to pay for the simplicity is that any of the laser input will have to suffer at least 75% (or 6 dB) minimum power loss due to basic physics constraints of combing SM optical power using a splitter/combiner or non-multiplexing scheme. The PLC can also be used to make a WDM multiplexer. The advantage of using a PLC chip with butt coupling directly to a laser or photodetector chip on one end and to a fiber on the other end is its relative simplicity. The PLC is a mass-production friendly technology. However, the limitation is the high power coupling loss, not only just for the >6 dB fundamental combing loss in the PLC combiner case, but also for the WDM Mux/DeMux scheme that also suffers severe waveguide bending loss associated with the high refractive index material for PLC waveguides. For example, using a silicon material for the PLC, the butting oriented coupling at both front and back ends of the silicon PLC chip together with its inherent waveguide absorption and bending loss will mount to be >5 dB. Silica may be used and has a matching refractive index to glass fiber to form PLC waveguides on chip. However, such a chip will inevitably have much larger chip area unless a chip designer plans to endure severe bending loss (e.g., >5 dB if making the chip as compact as its silicon counterparts).

FIG. 4 shows a parallel optics transceiver for 40 Gbps for multi-mode (MM) fibers based on vertical cavity surface emitting laser (VCSEL) array technology. VCSEL is directly modulatable to ~10 Gbps and very inexpensive comparing to distributed feedback (DFB) lasers, thus suitable for various short reach links (e.g., <300 meters). Many applications can afford using parallel ribbon fibers (MM fibers) to link between some equipment racks inside a data or cloud center. FIG. 4 shows that TOSA and ROSA for the VCSEL based transceiver have 4 fiber ports. Such TOSA and ROSA due to not having Mux/DeMux components on board (see FIG. 5) are much compact and straightforward than their SM counterpart shown in FIG. 2. As far as the current transceiver types are concerned, QSFP, XFP, CXP, CFP, CFP-2 form factor standards can support array fiber connector interfaces such as MPO or MTP connectors that allow up to 12 fibers in a single row on a multi-fiber ferrule. FIG. 6 shows a typical MPO/MTP array fiber connector. An exemplary QSFP optical transceiver accepts this array fiber connector format. An MPO/MTP connector ensures all fibers to be connected with a small ~0.35 dB insertion loss because it uses a high precision guide pin structure on the two ends of the rectangular shaped fiber ferrule.

In a brief summary, the above mentioned prior arts illustrate several important facts:

Transceivers must incorporate multi-wavelengths in the future for the era where the data rate needs to be in excess of 40 Gbps for a SM fiber reach of >2 km.

Many current transceiver standards shall be capable of accepting MTP/MPO fiber array connectors.

Incorporating multi-wavelength Mux/DeMux inside transceivers will cost the already tight real estate inside a transceiver regardless of using either thin-film or PLC based Mux/DeMux technology.

Accordingly, there is a need for improved techniques that separate the multi-wavelength Mux/DeMux functionality out of the main transceiver body. This separation allows the TOSA and ROSA community to continue to focus on active component (e.g., lasers, modulators, photo-detectors) integration management which itself sees increasing complexity that demands more space inside a transceiver. The separated MDOC is a purely passive component, thus the makers thereof in future can focus on making this type of passive devices more compact, reliable and lower in cost.

SUMMARY

This section is for the purpose of summarizing some aspects of the present application and to briefly introduce some preferred embodiments. Simplifications or omissions may be made to avoid obscuring the purpose of the section. Such simplifications or omissions are not intended to limit the scope of the present application.

In general, the present application is related to WDM Mux/DeMux on cable and methods of making the same. According to one aspect of the present application, a unit designed to provide multiplexing or demultiplexing (Mux/Demux) functions is implemented on cable. In other words, the Mux/Demux unit is coupled by a multi-fiber cable to a system (e.g., a system rack for router or switch that has multiple pluggable transceiver slots). The system comprises: a pluggable active module having a plurality of multi-wavelength transmitting optical sub-assembly (TOSA) units and receiving optical sub-assembly (ROSA) units, each having multiple parallel wavelength channels and a multi-fiber connector adapter port; at least a passive optical unit housed in an enclosure, wherein the passive optical unit is provided to perform multiplexing or demultiplexing (Mux/Demux) functions and facilitate Mux/DeMux of the wavelength channels; and a multi-fiber cable provided to couple the passive optical unit to the pluggable active module.

One of the advantages, objects and benefits in the present application is to alleviate the pressure on the TOSA/ROSA and transceiver manufacturers to provide more spaces with passive optical functions such as Mux/DeMux. This is done by separating out those functions out of a multi-wavelength transceiver to a unit on cable.

The present application may be implemented as a method, an apparatus or a part of a system. According to one embodiment, the present application is an optical device comprising: an enclosure including optical components to provide multiplexing or demultiplexing (Mux/Demux) functions; and a cable having first and second ends, the first end coupled with an interface to be accommodated into one of multiple pluggable transceiver slots in a system rack, the second end coupled with a first end of the enclosure, wherein a second end of the enclosure is coupled with at least one optical fiber. In general, the optical components are fixed to a substrate housed in the enclosure.

In one embodiment, the enclosure is a ruggidized cage to accommodate the unit with two transition areas that are provided in the enclosure to isolate fibers from experiencing undesired forces.

Other objects, features, and advantages of the present application will become apparent upon examining the following detailed description of an embodiment thereof, taken in conjunction with the attached drawings.

BRIEF DESCRIPTION OF THE DRAWINGS

These and other features, aspects, and advantages of the present application will become better understood with regard to the following description, appended claims, and accompanying drawings where:

FIG. 5 shows a tap filter packaged as a 3-port optical device according to one embodiment of the present application;

DETAILED DESCRIPTION

In the following description, numerous specific details are set forth in order to provide a thorough understanding of the present application. However, it will become obvious to those skilled in the art that the present application may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present application.

Reference herein to "one embodiment" or "an embodiment" means that a particular feature, structure, or characteristic described in connection with the embodiment can be included in at least one embodiment of the application. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the application do not inherently indicate any particular order nor imply any limitations in the application.

Embodiments of the present application are discussed herein with reference to FIGS. 7-17. However, those skilled in the art will readily appreciate that the detailed description given herein with respect to these figures is for explanatory purposes as the application extends beyond these limited embodiments.

Figure 1:
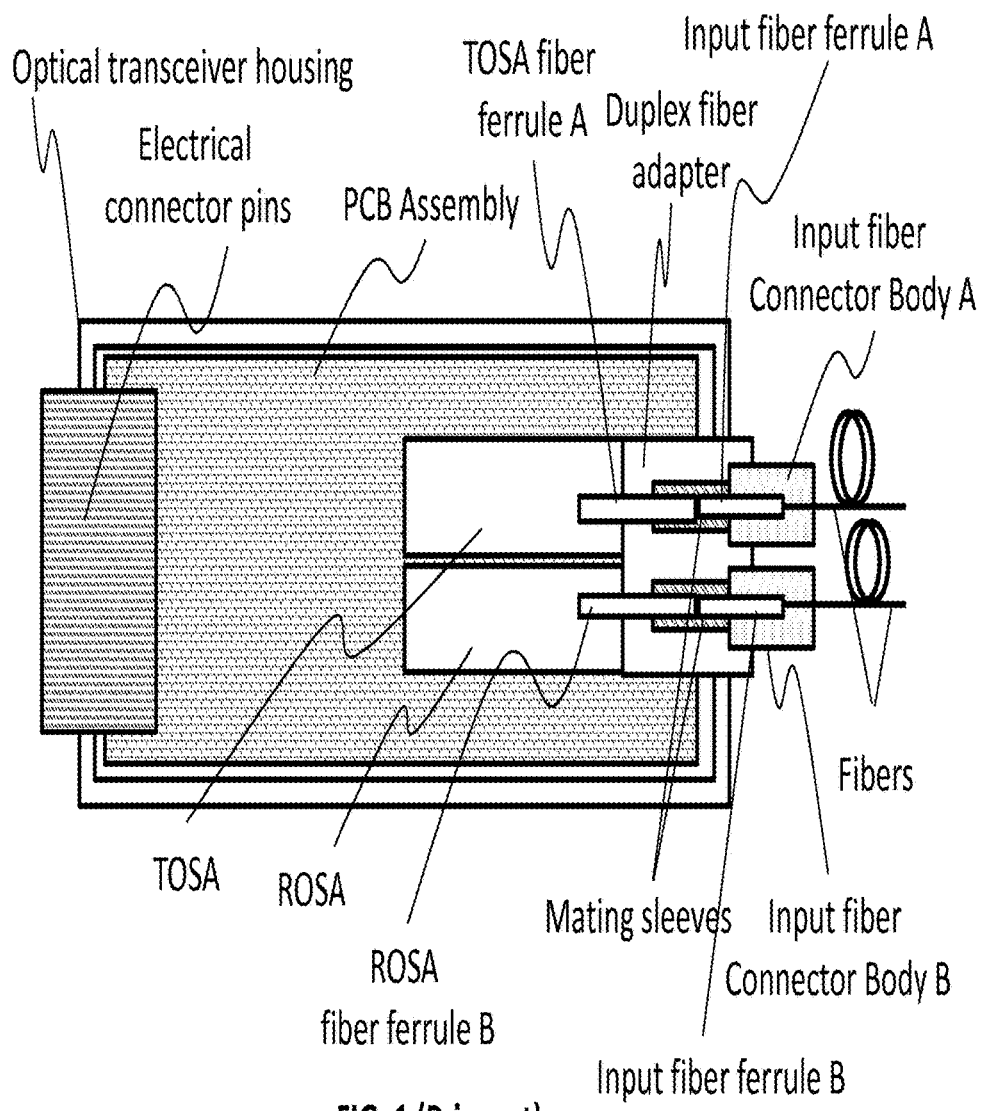
FIG. 1 shows a typical fiber optical transceiver architecture.
Figure 2:
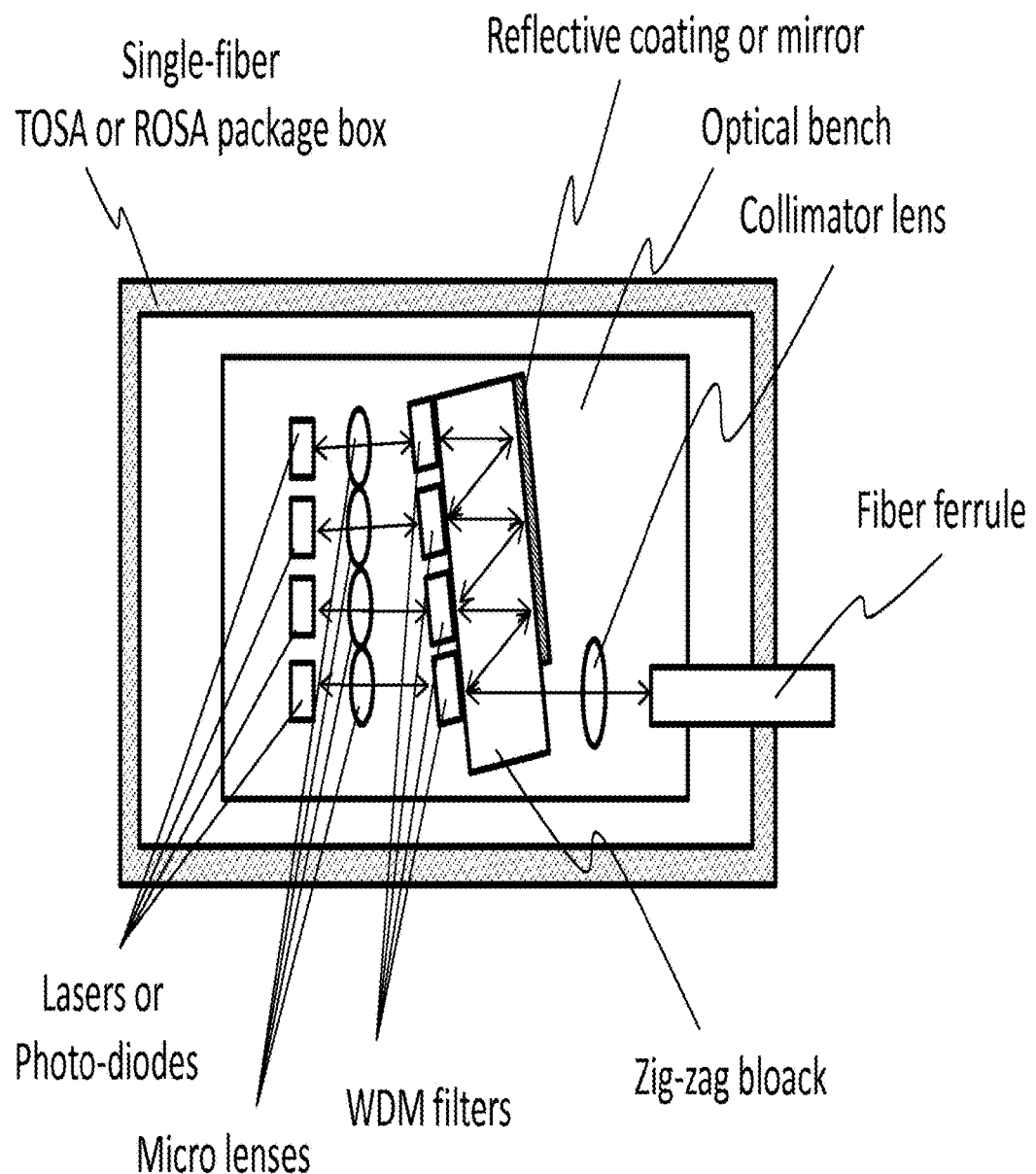
FIG. 2 shows a 4-ch TOSA/ROSA.
Figure 3:
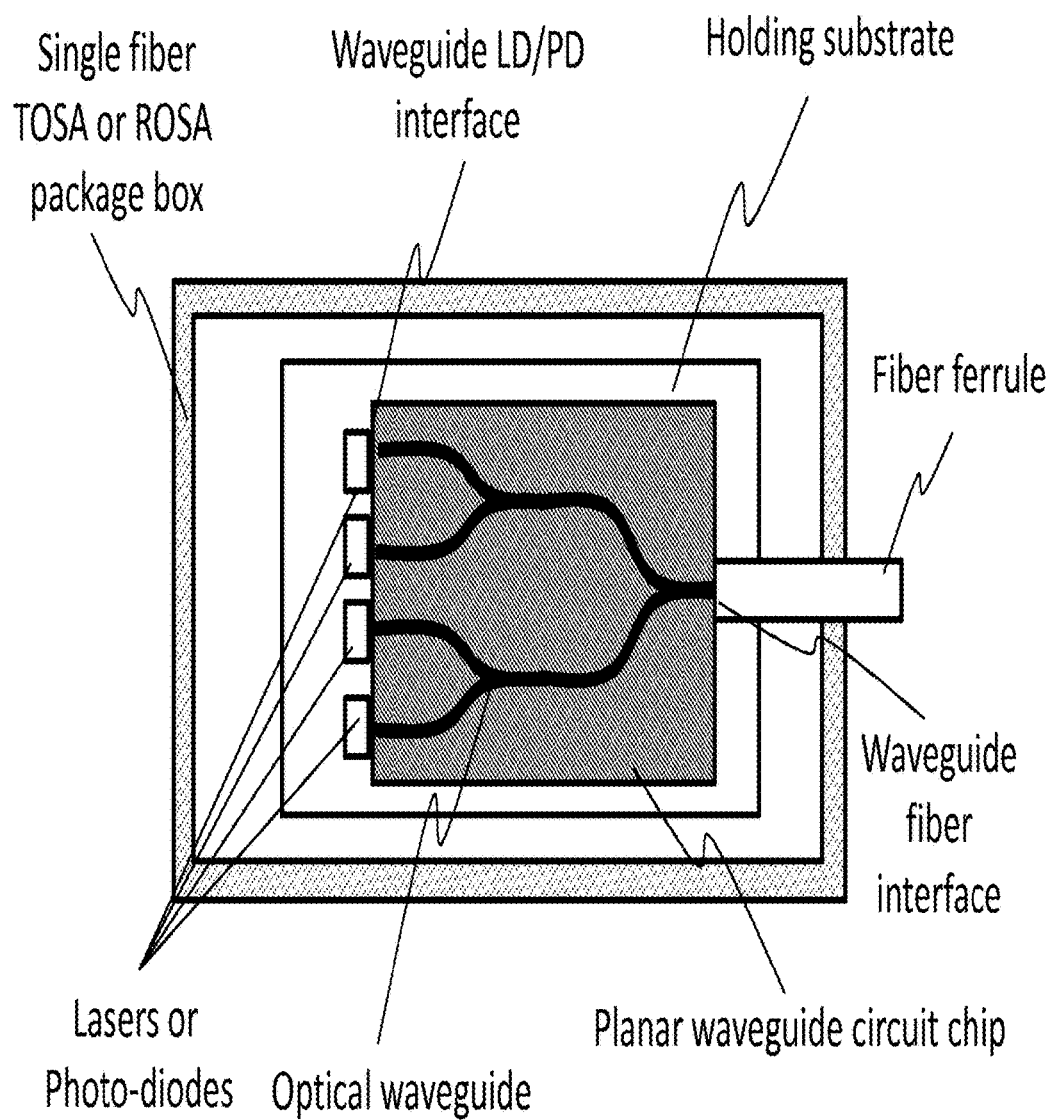
FIG. 3 shows a typical PLC based combiner that acts as a 4-to-1 WDM input combiner.
Figure 4:
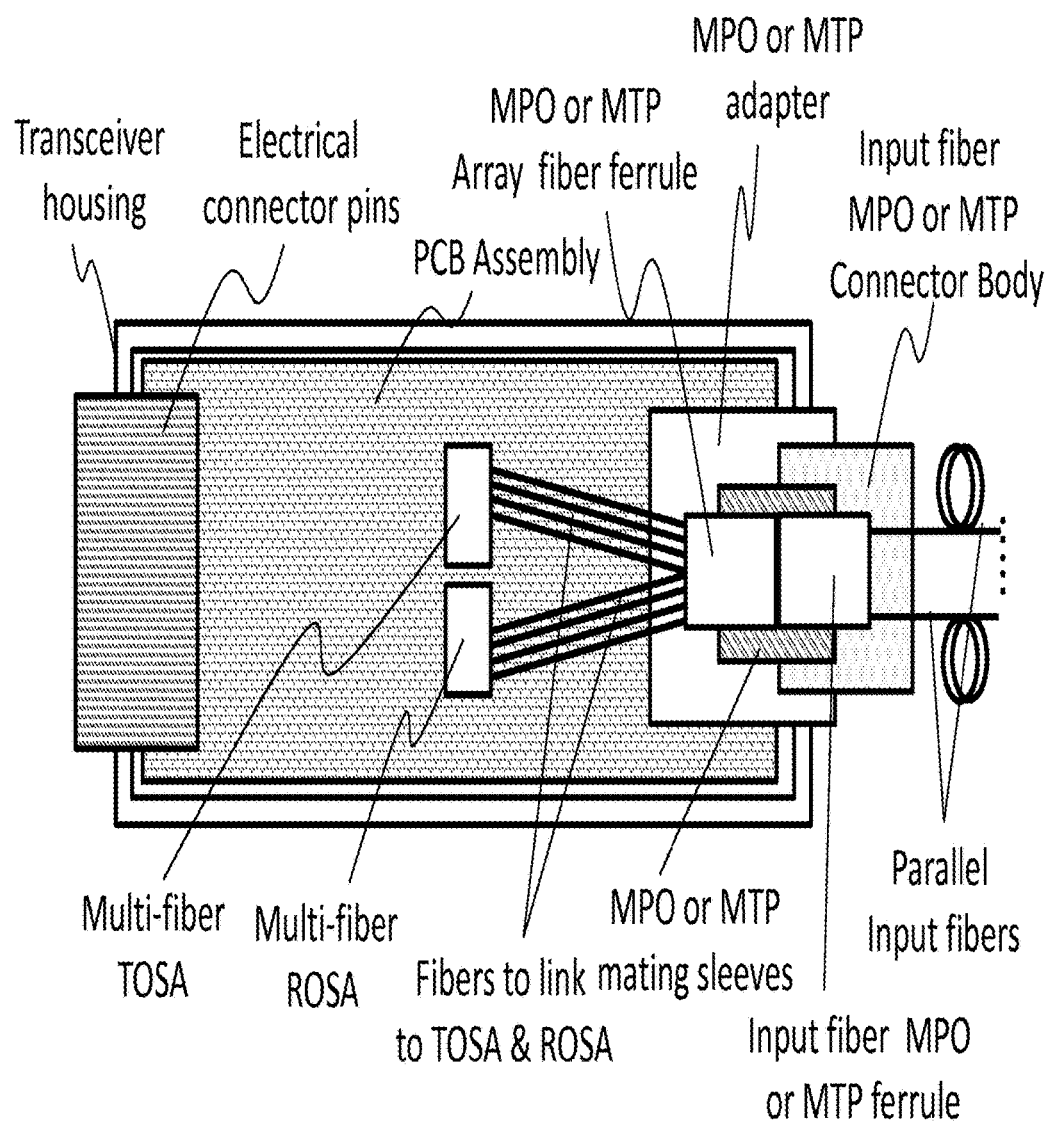
FIG. 4 shows a parallel optics transceiver for 40 Gbps for multi-mode (MM) fibers based on vertical cavity surface emitting laser (VCSEL) array technology.
Figure 5:
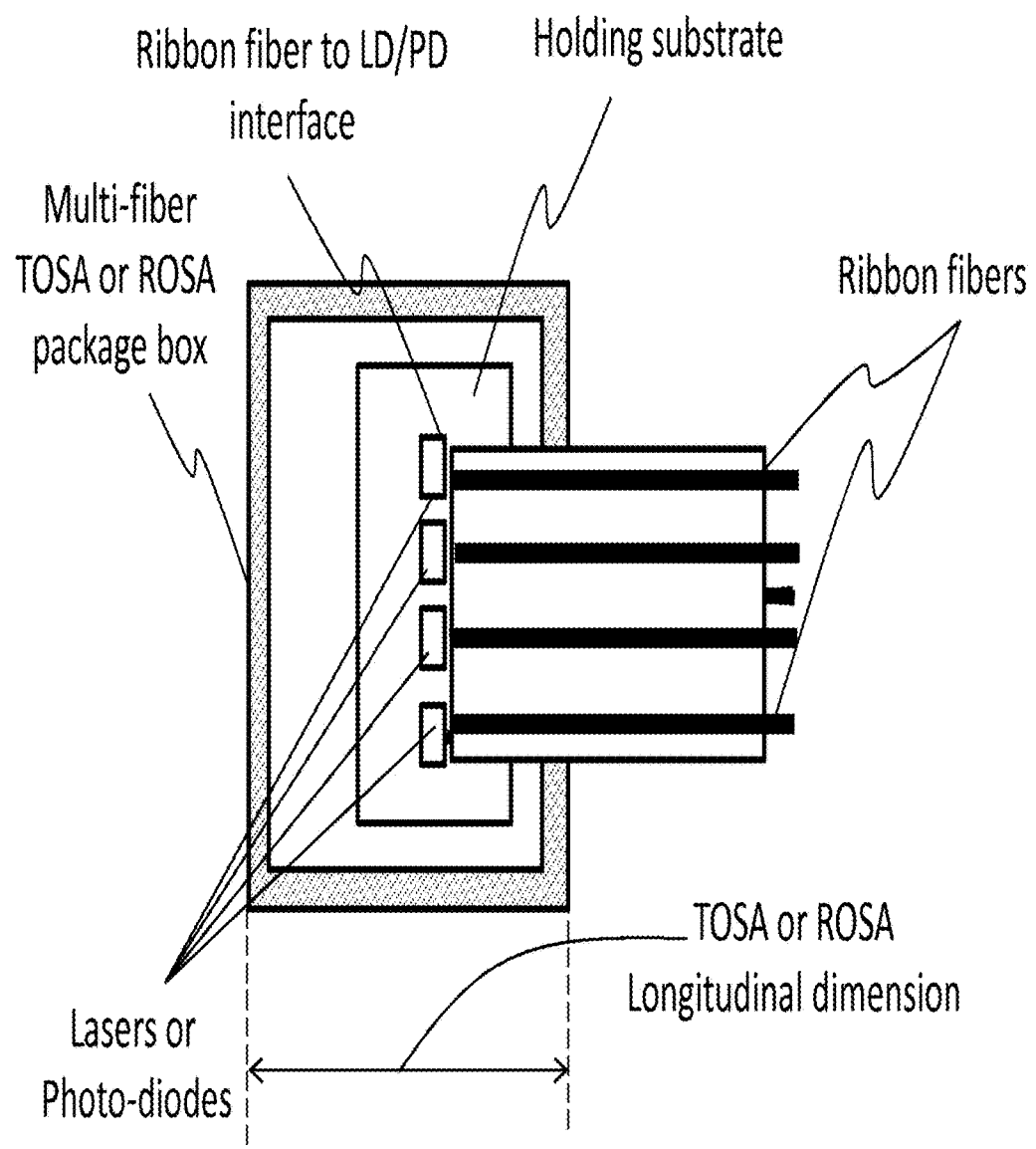
FIG. 5 shows that TOSA and ROSA, due to not having Mux/DeMux components on board, are much compact and straightforward than their SM counterpart shown in FIG. 2.
Figure 6:
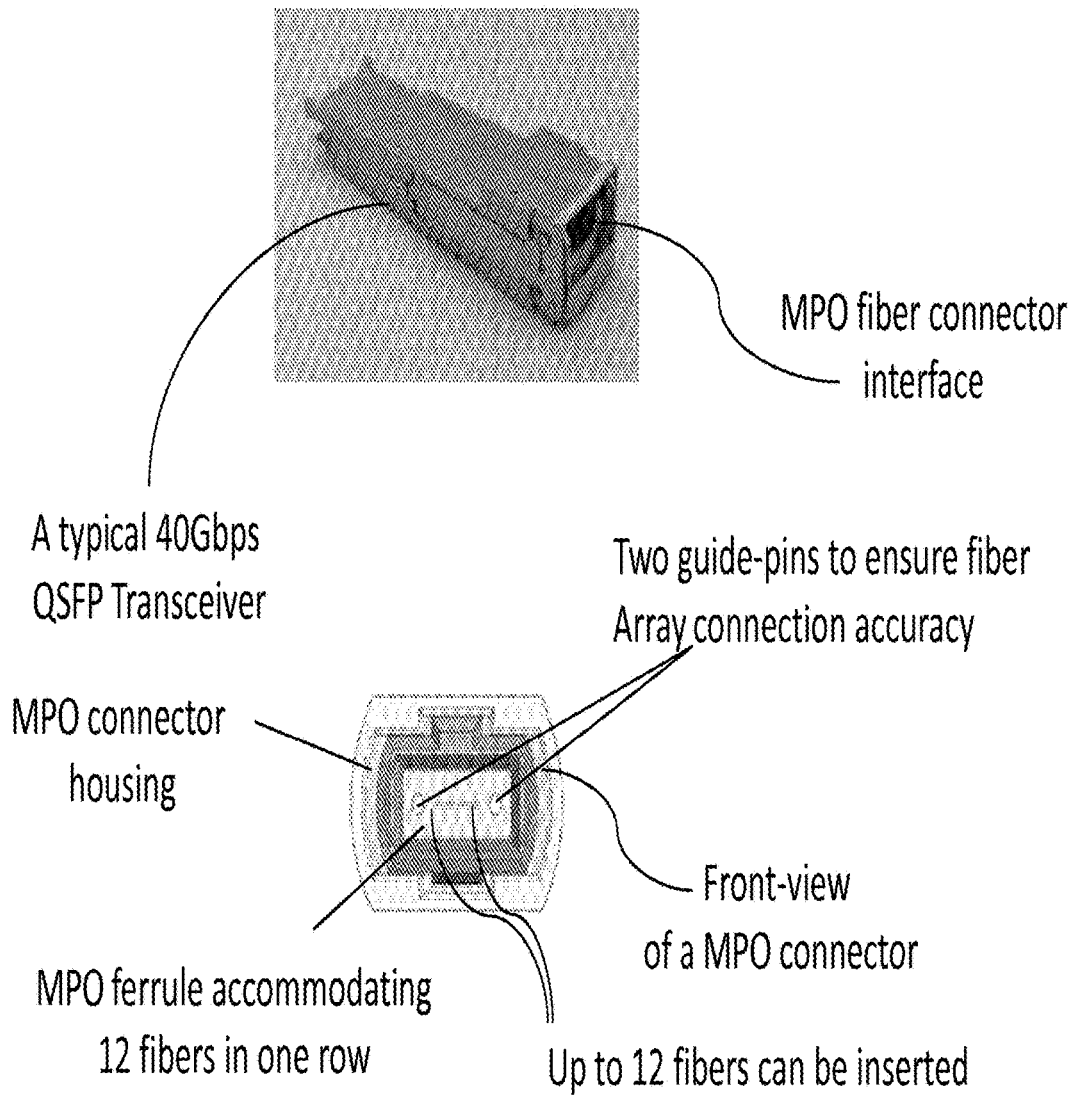
FIG. 6 shows a typical MPO/MTP array fiber connector.
Figure 7:
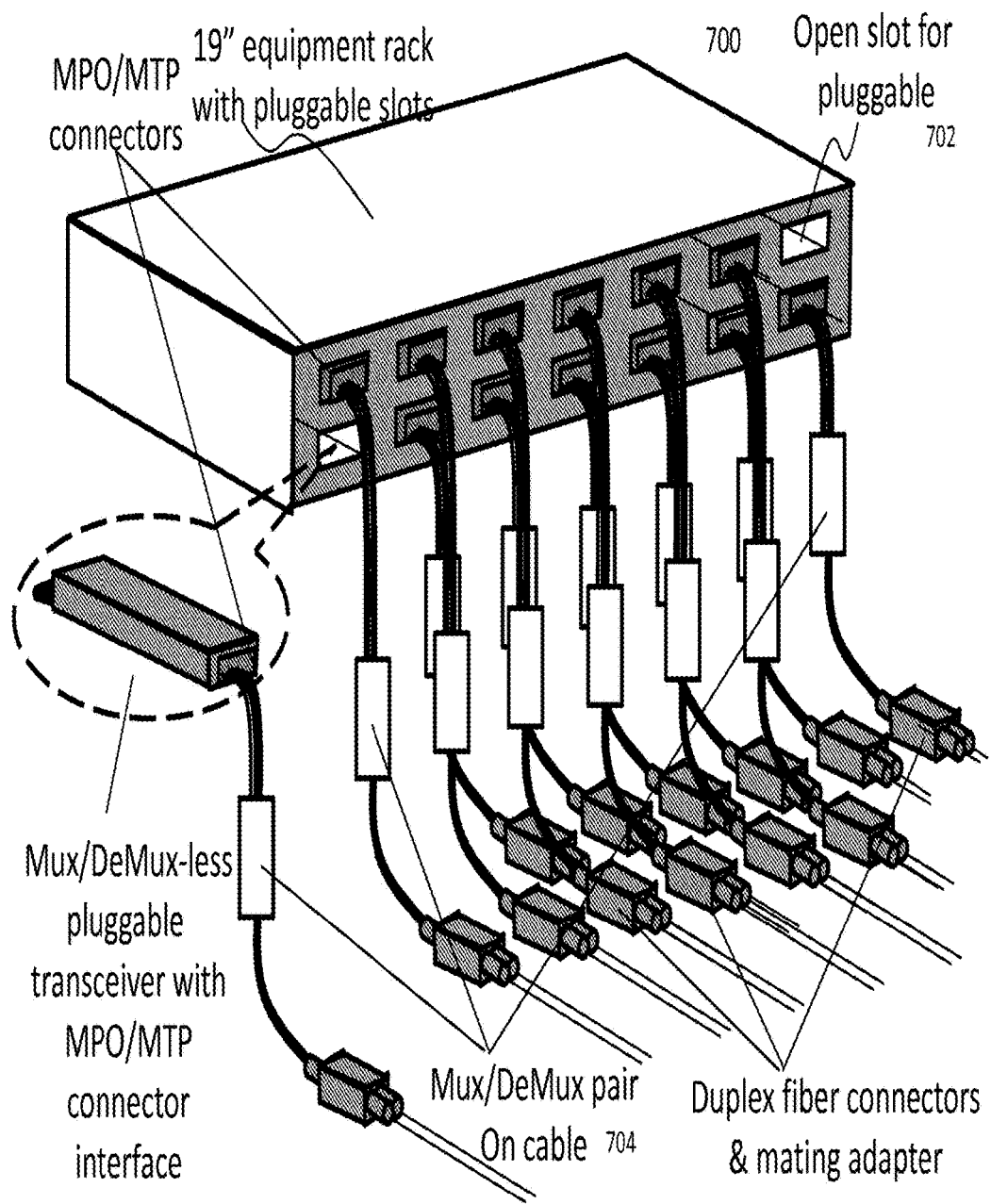
FIG. 7 shows a typical 19" system rack 700 for router or switch that has multiple pluggable transceiver slots.

Referring now to the drawings, in which like numerals refer to like parts throughout the several views, FIG. 7 shows a typical 19" system rack 700 for router or switch that has multiple pluggable transceiver slots. Each of the slots 702 may accommodate a QSFP or other pluggable transceiver type as long as it accepts MPO/MTP array fiber connector. According to one embodiment of the present application, instead of making a full functional on-board 40 Gbps, 100 Gbps or 400 Gbps transceiver with multi-wavelength Mux/DeMux, a transceiver is implemented in an enclosure on a cable. As shown in FIG. 7, a transceiver in the enclosure 704 is implemented on a cable with an MPO/MTP connector interface, hence Mux/DeMux on cable (MDOC). The transceiver 704 includes some integrated active components such as SM laser diodes (LDs), photo-diodes (PDs), and amplifiers. In one embodiment, the necessary SM Mux/DeMux functions are separated out into an independent compact enclosure hung on a MPO/MTP cable that contains the equal number of fibers providing the links between a pluggable transceiver for the system rack 700 and the Mux/DeMux. The Mux/DeMux optical outputs for SM fibers are provided on the other side of the enclosure in a duplex cable form. The cable is terminated by a duplex fiber connector/adapter pair so that a SM fiber duplex cable of up to 2 km length can be plugged into it.

Figure 8:
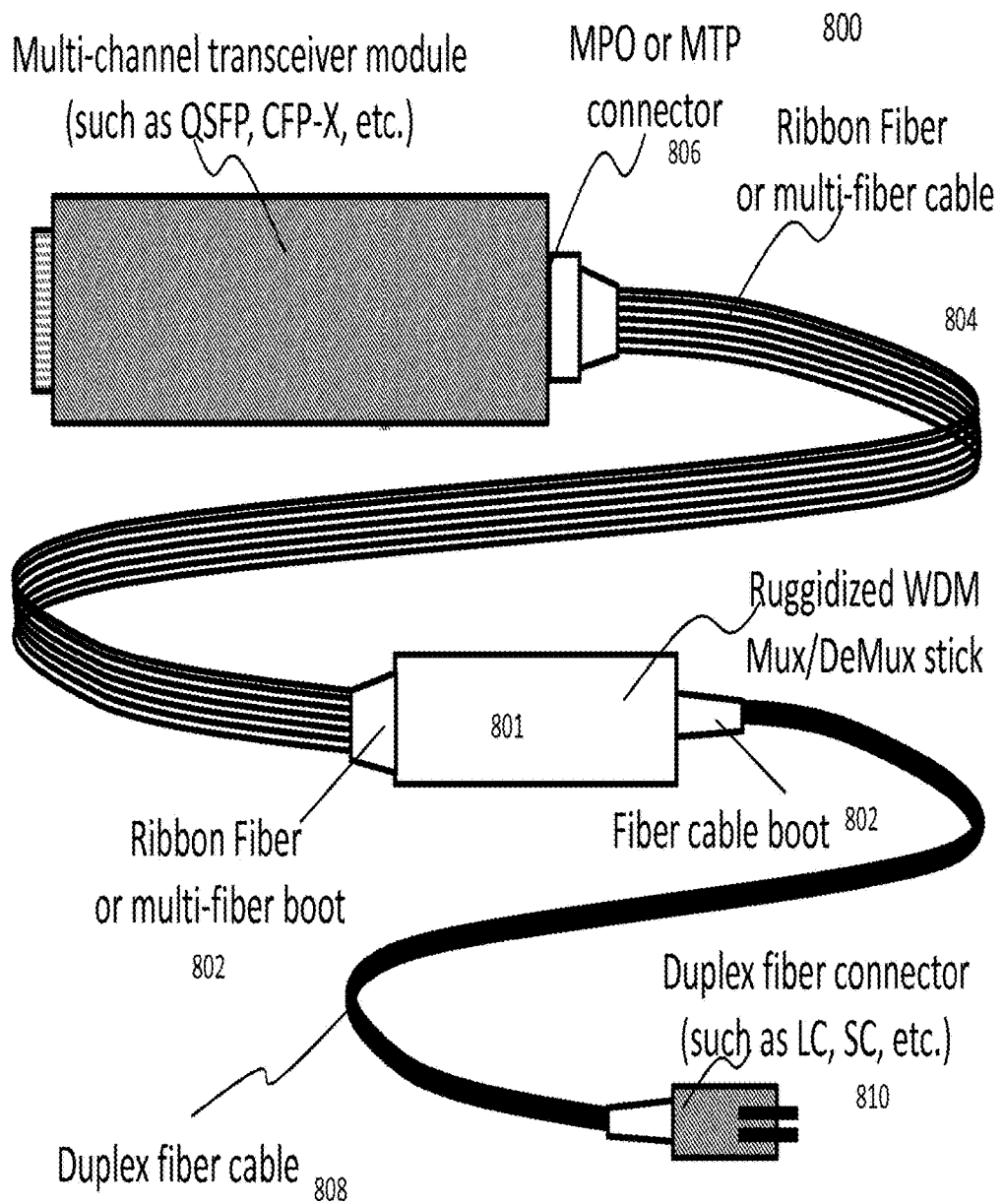
FIG. 8 shows one embodiment of the present application housed in an enclosure that is environmentally hardened and provided with a boot on either side to ensure ribbon fiber and duplex cables can withstand normal cable handling stress, such as side pull, retention and cable flex.

FIG. 8 shows a detailed view of one embodiment of an MDOC 800. The Mux/DeMux device 801 housed in an enclosure is environmentally hardened and is provided with a boot 802 on either side to ensure ribbon fiber and duplex cables can withstand normal cable handling stress, such as side pull, retention and cable flex. While the ribbon fiber side of the cable 804 is terminated by an MPO/MTP connector 806, the duplex cable side 808 is terminated by two individual fiber connectors or their duplex counterpart 810 that integrate two connectors into one. It is also possible to directly integrate the two single fiber connectors and its mating adapter into a single unit to serve as pigtailed duplex fiber adapter.

Figure 9:
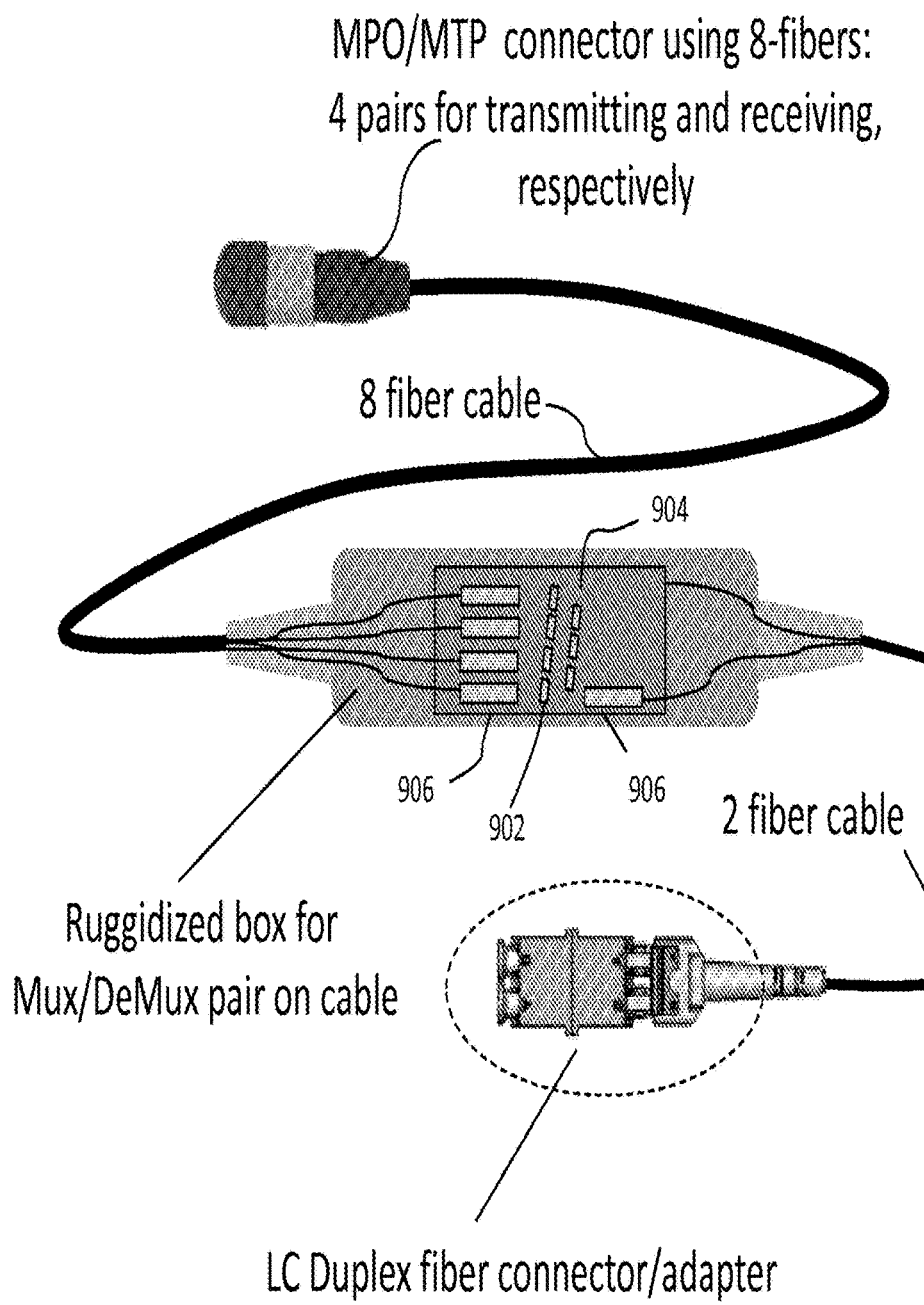
FIG. 9 shows an embodiment based on thin-film technology for the Mux/DeMux functionality.
Figure 10:
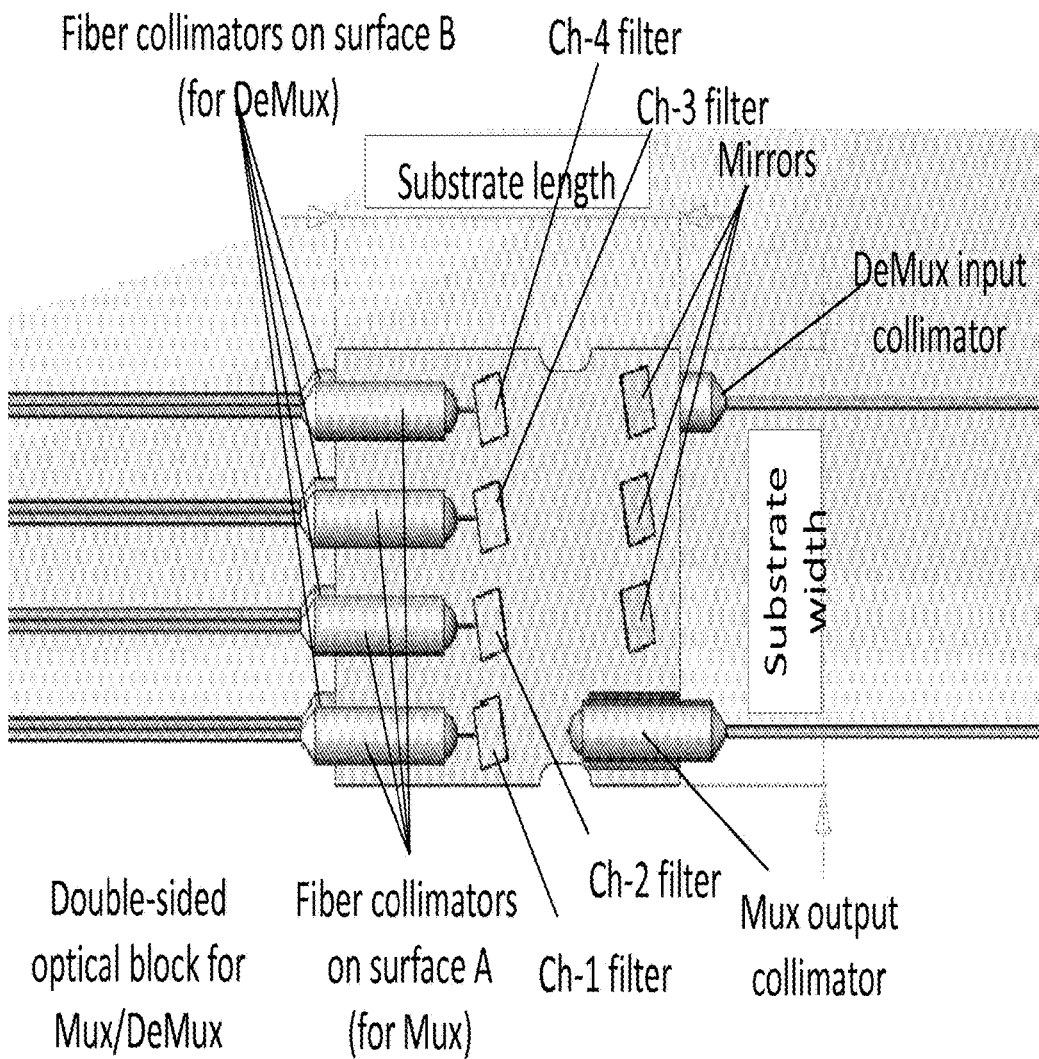
FIG. 10 shows how the Mux/DeMux functionality is implemented by a single block.

Depending in implementation, the Mux/DeMux can be a thin-film based or PLC based or a combination of the two technologies. FIG. 9 shows an embodiment 900 based on thin-film technology for the Mux/DeMux functionality. Four WDM thin-film filters 902 are used, each for a different WDM channel is fixed by epoxy on a substrate that could be made of metal, ceramic or glass material. Three mirrors 904 are aligned to receive and reflect respective beams to such four filters 904 in the well-known zig-zag geometry. Three mirrors 904 they are also fixed to the substrate using the epoxy. Five collimators 906 with four on one end of the substrate while the other one is on its opposite end are also aligned and epoxy fixed (may be with some additional structure components such as glass wedges, rods, blocks) on the same substrate. Shown in FIG. 9 is only one side of the substrate due to the other side is hidden in the drawing. FIG. 10 shows how this Mux/DeMux functionality is implemented by a single block. One notable difference from the FIG. 8 architecture is that the eight fibers from the transceiver side cable are putting into one common buffered cable instead of keeping them in a ribbon form.

Figure 11:
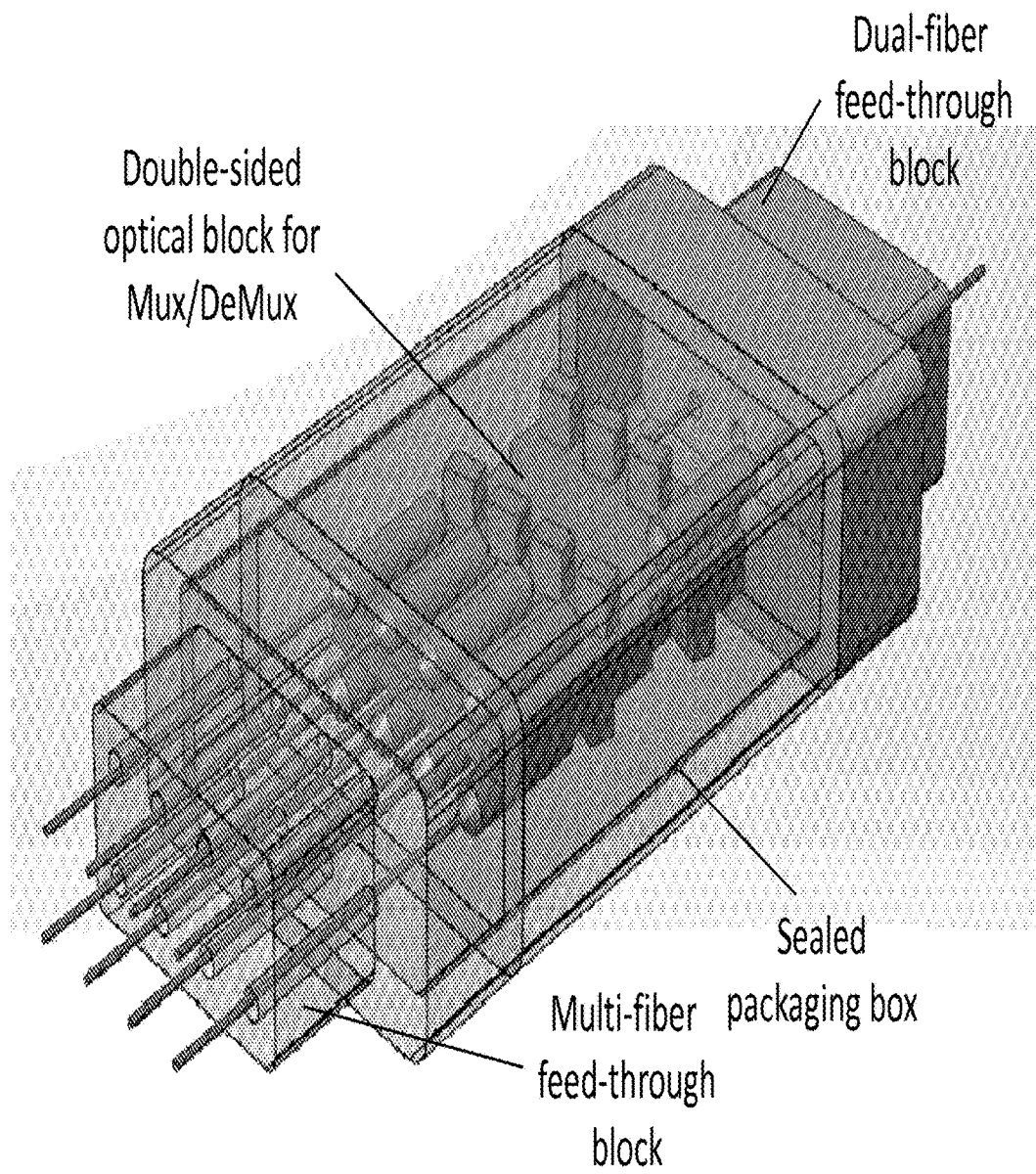
FIG. 11 shows one embodiment having a Mux/DeMux unit with fiber feed-through on each of two sides of a substrate.
Figure 12:
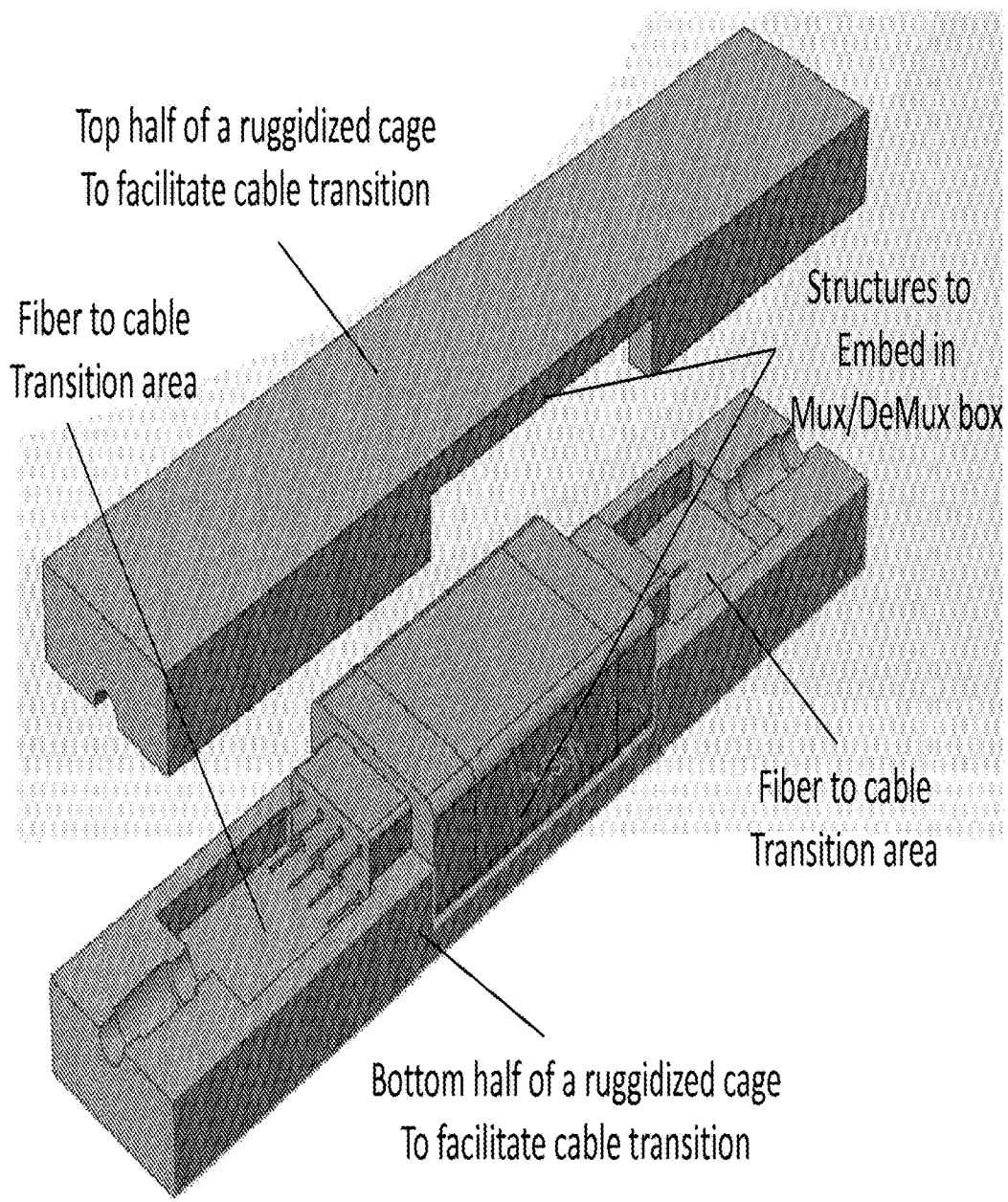
FIG. 12 shows, in one embodiment, an extra cage is provided to form a ruggedized package that protects the Mux/DeMux unit with an additional enclosure.

Since the Mux/DeMux functioning block must be environmentally hardened, the packaging of it shall be considered to isolate moisture from entering and destroying the thin-film filters, mirrors and collimators. In one embodiment, a dual-sided substrate is inserted into a tube-like enclosure, where each side end cap is a fiber feed-through unit having the right number of holes for fiber access. The tube also needs to have sliding guides in the middle so that the edges of the dual-sided block can follow the guides to slide in This sliding structure prevents the micro optic components from touching on any part of the tube walls. FIG. 11 shows one embodiment having a Mux/DeMux unit with fiber feed-through on each of two sides of the substrate. This enclosing structure shown in FIG. 11 can be epoxy sealed, soldered or even laser welded so that moisture would not enter and degrade the performance of each individual functioning component inside.

Figure 13:
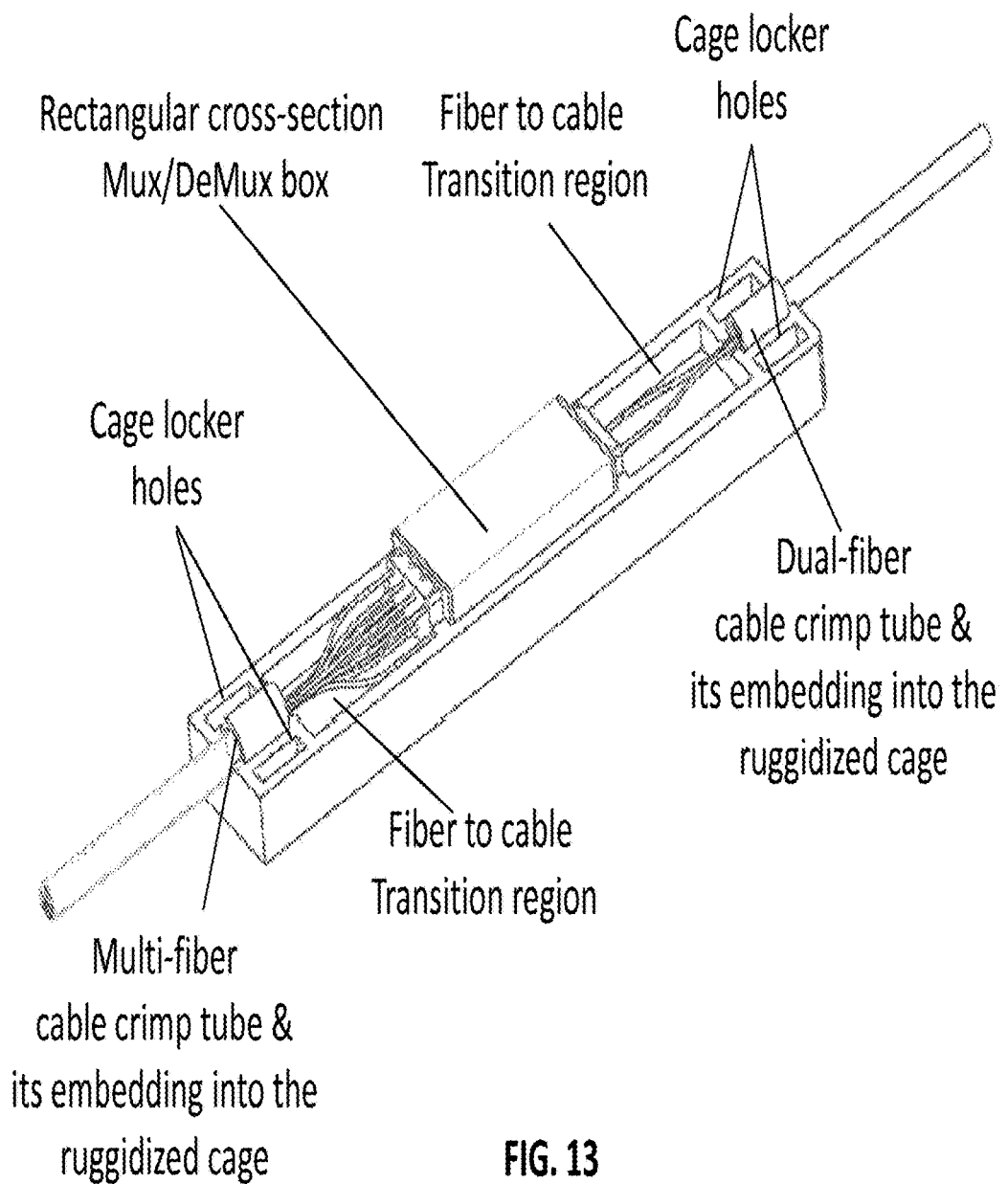
FIGS. 13-15 show respectively several embodiments of the application, where the Mux/Demux enclosures can take the form of a rectangular, circular or hexagonal in cross section.
Figure 14:
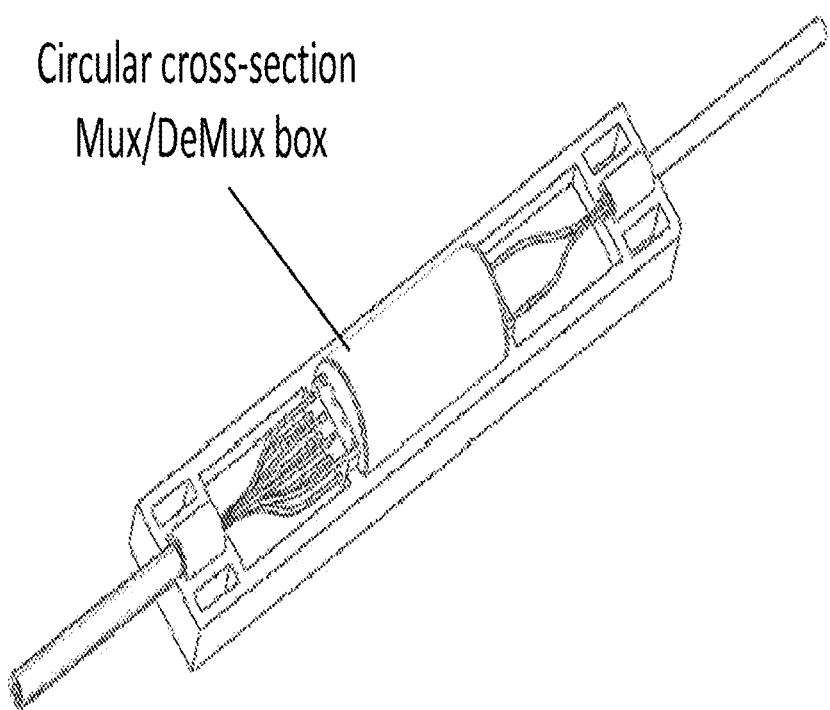
Figure 15:
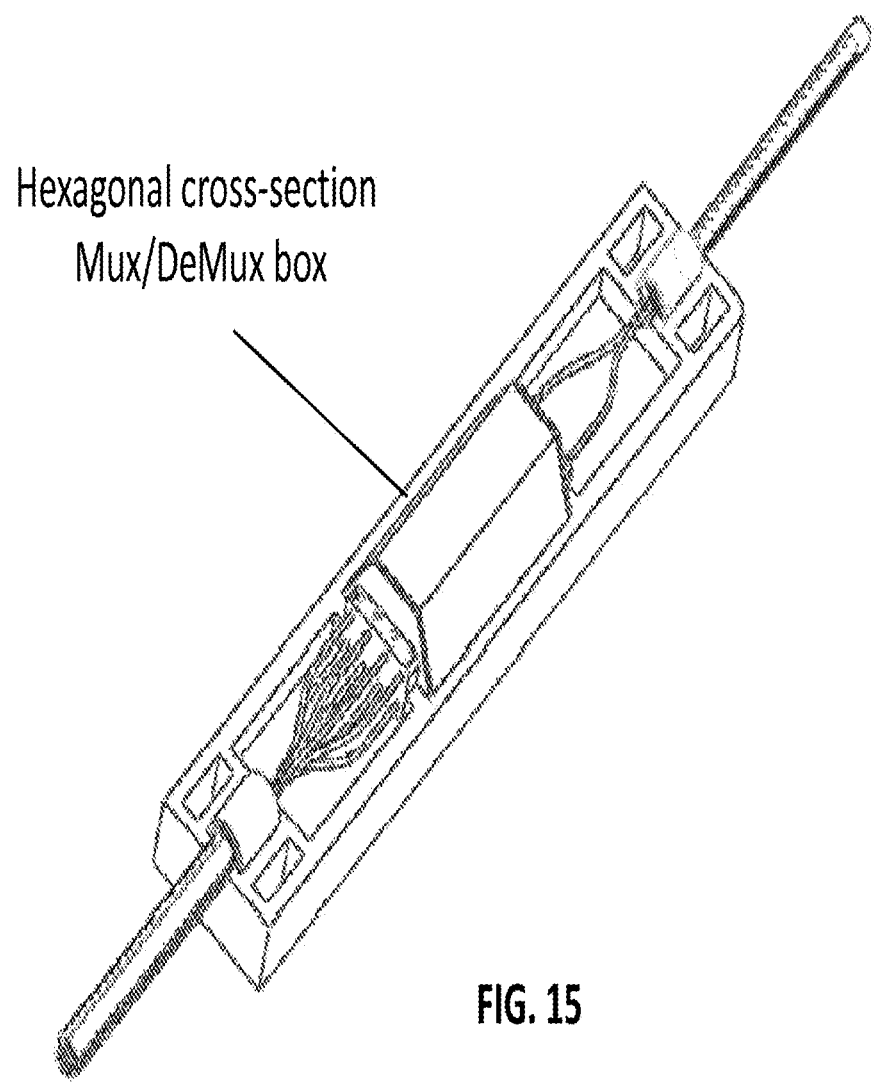
Figure 16:
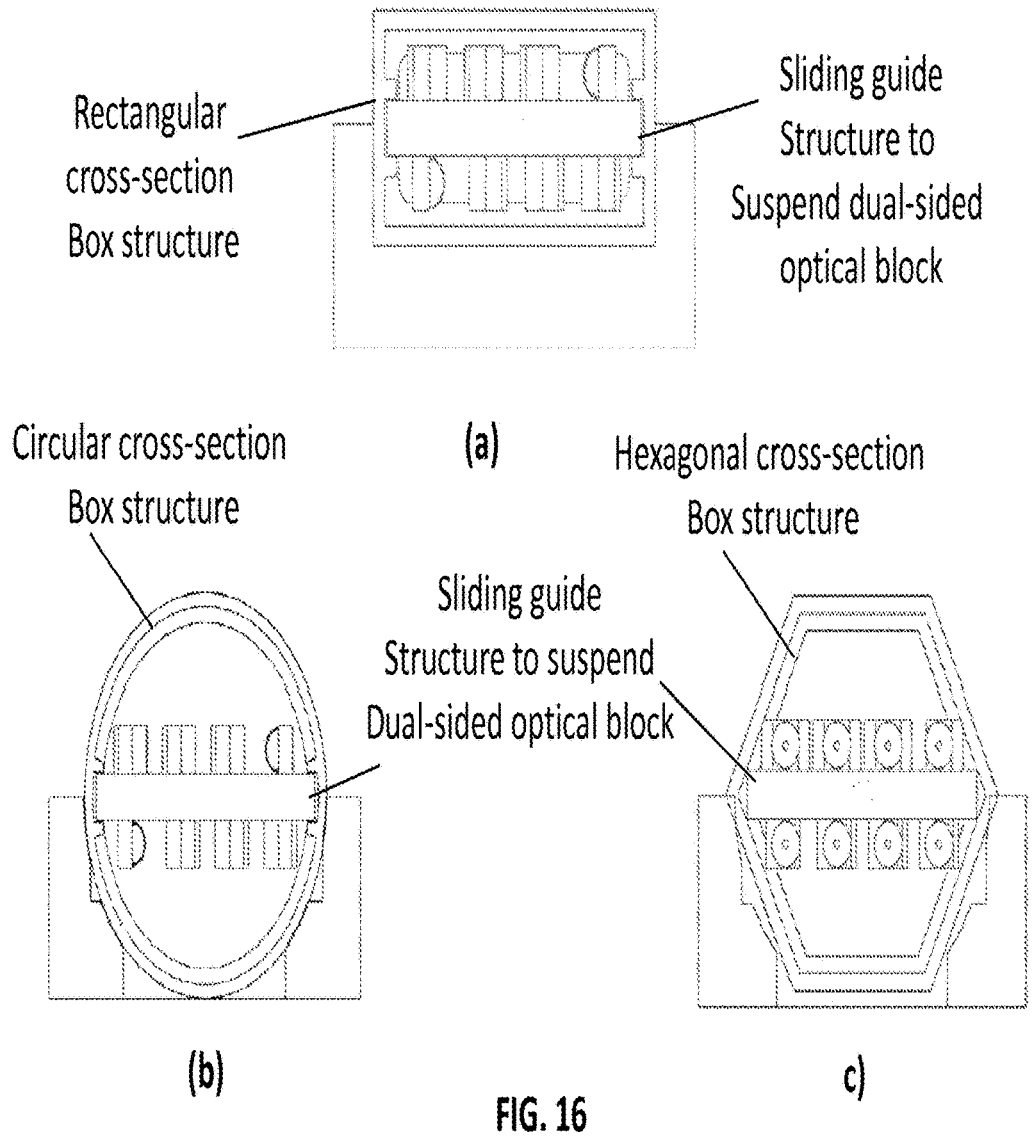
FIG. 16 and FIG. 17 further show respectively some variations of the crimp tubes for cables, both dual fiber and multi-fiber types.
Figure 17:
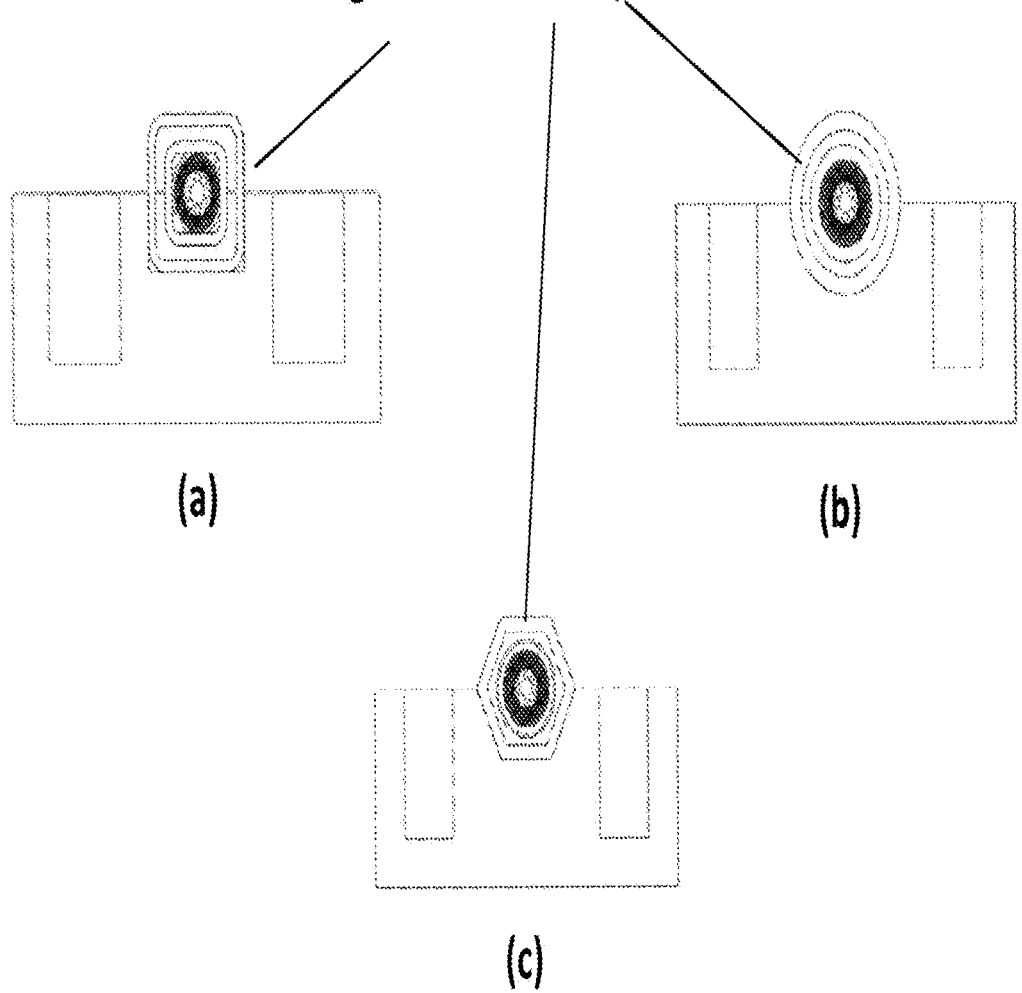

One of the features for an environmentally hardened device is that it must stand for more handling stress. In particular, fiber cables of the MDOC contemplated in one embodiment of the present application must withstand various kinds of cable retention forces. Thus, in one embodiment, an extra cage is provided to form a ruggedized package that protects the Mux/DeMux unit with an additional enclosure shown in FIG. 12. The sealed Mux/Demux body is embedded into the slots of two halves of the ruggidized enclosure. To isolate fibers from taking undesired forces, each of the two cable crimp tubes is used to shield cable retention forces. The crimp tubes are embedded into the ruggidized box and they lock up cable Kevlar fabrics that act as structure members of the cable. With this extra protection, any external pull forced that put on the cables will not be transmitted to the optical fibers. FIGS. 13-15 show respectively several embodiments of the application, where the Mux/Demux box enclosures can take the form of a rectangular, circular or hexagonal in cross section. FIG. 16 and FIG. 17 further show respectively some variations of the crimp tubes for cables, both dual fiber and multi-fiber types.

The present application has been described in sufficient details with a certain degree of particularity. It is understood to those skilled in the art that the application embodiments has been made by way of examples only and that numerous changes in the arrangement and combination of parts may be resorted without departing from the spirit and scope of the application as claimed. Accordingly, the scope of the present

What we claim is:
1. An optical device comprising:
a first enclosure comprising a first transition area inside the first enclosure at a first end of the first enclosure, a second transition area inside the first enclosure at a second end of the first enclosure, and passive optical components between the first transition area and the second transition area to provide multiplexing or demultiplexing (Mux/Demux) functions;
a multi-fiber cable extending from outside the first enclosure to the first transition area inside of the first enclosure for optical coupling of a plurality of optical fibers of the multi-fiber cable to the passive optical components of the first enclosure;
a duplex fiber cable extending from outside the first enclosure into the second transition area inside the first enclosure and for optical coupling of at least two fibers, one optical fiber from an input to the passive optical components of the first enclosure to provide Mux/Demux functions and another optical fiber from an output of the passive optical components to provide Mux/Demux functions, wherein the plurality of optical fibers extend outwardly from the passive optical components of the first enclosure into the first transition area and to the multi-fiber cable and the at least two fibers extend outwardly from the passive optical components of the first enclosure into the second transition area and to the duplex fiber cable; and
a second enclosure coupled to the multi-fiber cable in a form factor to be received in one of multiple pluggable transceiver slots in a system rack, the second enclosure including a transceiver;
wherein the first transition area and the second transition area isolate the plurality of fibers of the multi-fiber cable and the at least two fibers of the duplex fiber cable from external pull forces on the multi-fiber cable and the duplex fiber cable, respectively.

2. The optical device of claim 1, wherein the passive optical components are fixed to a substrate housed in the first enclosure.

3. The optical device of claim 2, wherein the passive optical components and the substrate are epoxy sealed, soldered or laser welded in a unit so that moisture would not enter into the unit or degrade performance of each of the passive optical components.

4. The optical device of claim 1, wherein the first enclosure is a ruggidized cage to accommodate the first transition area and the second transition area.

5. The optical device as recited in claim 4, wherein the passive optical components are embedded within the ruggidized cage.

6. The optical device as recited in claim 4, further comprising a first crimp tube for the multi-fiber cable and a second crimp tube for the duplex fiber cable, wherein the first and second crimp tubes are embedded in the ruggidized cage to isolate the plurality of fibers and the at least two fibers from experiencing undesired forces.

7. The optical device as recited in claim 1, wherein the multi-fiber cable is a fiber ribbon or encapsulated in a multi-fiber boot.

8. The optical device as recited in claim 1, wherein the duplex fiber cable extends beyond the first enclosure and ends in a duplex fiber connector.

9. The optical device as recited in claim 1, wherein the Mux/DeMux functions are implemented based on thin-film filters, a planar lightwave circuit (PLC) or a combination of the thin-film filters and PLC.

10. A system comprising:
a pluggable active module having a plurality of multi-wavelength transmitting optical sub-assembly (TOSA) units and receiving optical sub-assembly (ROSA) units, each having multiple parallel wavelength channels and a multi-fiber connector adapter port, wherein the pluggable active module in a form factor to be received in one of multiple pluggable transceiver slots in a system rack;
an enclosure comprising a box with a first end and a second end, a first transition area inside the enclosure at the first end of the box and a second transition area inside the enclosure at the second end of the box, the box housing at least one passive optical unit, wherein the passive optical unit including passive optical components is provided to perform multiplexing or demultiplexing (Mux/Demux) functions and facilitate Mux/DeMux of the wavelength channels;
a multi-fiber cable extending from outside the enclosure into the first transition area inside the enclosure for optical coupling of a plurality of fibers of the multi-fiber cable to the at least one passive optical unit housed in the box; and
a duplex fiber cable extending from outside the enclosure into the second transition area inside the enclosure for optical coupling of at least two fibers, one optical fiber from of the at least one passive optical component housed in the box to provide Mux/Demux functions and another optical fiber from an output of the at least one passive optical component to provide Mux/Demux functions, wherein the plurality of fibers extend outwardly from the at least one passive optical component house in the box into the first transition area and to the multi-fiber cable and the at least two fibers extend outwardly from the at least one passive optical component housed in the box into the second transition area and to the duplex fiber cable;
wherein the enclosure is a ruggidized cage, the box is embedded within the ruggidized cage, and the first transition area and the second transition area isolate the plurality of fibers of the multi-fiber cable and the at least two fibers from experiencing undesired forces resulting from external pull forces on the multi-fiber cable and the duplex fiber cable, respectively.

11. The system of claim 10, wherein the at least one passive optical component is fixed to a substrate housed in the box.

12. The system of claim 10, wherein the at least one passive optical component and the substrate are epoxy sealed, soldered or laser welded in a unit so that moisture will not enter into the unit or degrade performance of the at least one passive optical component.

13. The system of claim 10, further comprising a first crimp tube for the multi-fiber cable and a second crimp tube for the duplex fiber cable, wherein the first and second crimp tubes are embedded in the ruggidized cage to isolate the plurality of fibers and the at least two fibers from experiencing undesired forces.

14. The system of claim 10, wherein the multi-fiber cable is a fiber ribbon or is encapsulated in a multi-fiber boot.

15. The system of claim 10, wherein a cross section of the at least one passive optical unit is a polygon shape or a circular shape.

16. The system of claim 15, wherein the polygon shape is rectangular or hexagonal.

17. The system of claim 10, wherein the at least one passive optical component is fixed to two sides of a substrate to form two independently working (Mux/Demux) functions.

18. The system of claim 10, wherein the Mux/DeMux functions are implemented based on thin-film filters, a planar lightwave circuit (PLC) or a combination of the thin-film filters and PLC.

19. A system comprising:
a pluggable active module having a plurality of multi-wavelength transmitting optical sub-assembly (TOSA) units and receiving optical sub-assembly (ROSA) units, each having multiple parallel wavelength channels and a multi-fiber connector adapter port, wherein the pluggable active module in a form factor to be received in one of multiple pluggable transceiver slots in a system rack;
an enclosure comprising a box with a first end and a second end, the box housing at least one passive optical unit, wherein the passive optical unit including passive optical components is provided to perform multiplexing or demultiplexing (Mux/Demux) functions and facilitate Mux/DeMux of the wavelength channels, wherein the passive optical unit has at least two fibers extending externally from the second end of the box to a duplex fiber cable a predefined distance away from the passive optical unit; and
a multi-fiber cable provided to couple the passive optical unit to the pluggable active module, wherein the multi-fiber cable is coupled to a plurality of fibers from the passive optical unit extending from the first end of the box, wherein the passive optical components are fixed to a substrate housed in the box, the passive optical components and the substrate are epoxy sealed, soldered or laser welded in a unit so that moisture will not enter into the unit or degrade performance of each of the passive optical components;
wherein the enclosure is a ruggidized cage to accommodate two transition areas for the plurality of fibers to transition to the multi-fiber cable and the at least two fibers to transition to the duplex fiber cable, and isolate the plurality of fibers and the at least two fibers from experiencing undesired forces.

20. An optical device comprising:
a first enclosure and a second enclosure, wherein the first enclosure comprises a box with a first end and a second end opposite the first end, a first transition area inside the first enclosure and extending from the first end of the box and a second transition area inside the first enclosure and extending from the second end of the box, wherein the box houses passive optical components to provide multiplexing or demultiplexing (Mux/Demux) functions, and the second enclosure comprises a transceiver and in a form factor to be received in one of multiple pluggable transceiver slots in a system rack;
a multi-fiber cable extending from outside the first enclosure into the first transition area inside the first enclosure for optical coupling of a plurality of fibers of the multi-fiber cable to the passive optical components housed in the box;
a duplex fiber cable extending from outside the enclosure into the second transition area inside the first enclosure for optical coupling of at least two fibers, wherein the at least two fibers comprise one fiber from an input to the passive optical components to provide Mux/Demux functions and another fiber from an output of the passive optical components to provide Mux/Demux functions;
a first crimp tube for the multi-fiber cable and a second crimp tube for the duplex cable;
wherein the first and second crimp tubes are embedded in the first enclosure to isolate the plurality of fibers and at least two fibers, respectively, from experiencing undesired forces.

* * * * *